May 3, 1960 E. K. KARLSSON 2,935,193
CORN PITCHER

Filed Aug. 19, 1958 5 Sheets-Sheet 1

INVENTOR.
Elof K. Karlsson
BY Paul O. Pippel
Atty.

May 3, 1960　　　　　E. K. KARLSSON　　　　　2,935,193
CORN PITCHER

Filed Aug. 19, 1958　　　　　　　　　　　　5 Sheets-Sheet 2

INVENTOR.
Elof K. Karlsson
BY Paul O. Pippel
Atty.

May 3, 1960    E. K. KARLSSON    2,935,193
CORN PITCHER

Filed Aug. 19, 1958    5 Sheets-Sheet 3

Inventor:
Elof K. Karlsson
Paul O. Pippel
Atty.

May 3, 1960

E. K. KARLSSON 2,935,193

CORN PITCHER

Filed Aug. 19, 1958

INVENTOR.
Elof K. Karlsson
BY Paul O. Pippel
Atty.

United States Patent Office 2,935,193
Patented May 3, 1960

2,935,193

CORN PITCHER

Elof K. Karlsson, Moline, Ill., assignor to International Harvester Company, Chicago, Ill., a corporation of New Jersey Application August 19, 1958, Serial No. 755,976

12 Claims. (Cl. 209—136)

This invention relates to a new and improved corn pitcher.

Field traversing corn harvesting machines are generally equipped with upwardly and rearwardly extending elevators for physically carrying the harvested corn to a trailing wagon. The elevators used on these corn harvesters are of the slatted chain conveyor type wherein the corn is moved upwardly by reason of the slats on the chain conveyor and carried sufficiently high and rearwardly of the harvesting machine so that it may be dropped over a trailing wagon which is hitched behind the corn picker. The elevator is thus of substantial size and contains considerable mechanism in order to effectively convey the harvested ears of corn to the trailing wagon.

It is therefore a principal object of the present invention to provide means for delivering harvested ears of corn from a corn picker to a trailing wagon.

An important object of this invention is the provision of means for pitching harvested ears of corn from a corn picker to a trailing wagon.

Another important object of this invention is to supply in a corn pitcher for harvested ears of corn a laterally feeding auger conveyor in cooperation with an impelling type of rotor.

Still another important object of this invention is to equip a corn pitcher for corn pickers with centrally feeding auger conveyors from adjacent rows of harvested corn and joined by a rotor having paddles thereon and an enclosure for guiding the trajectory of the ears of corn as they are pitched by the impeller rotor to a trailing wagon.

Another and still further important object of this invention is to provide an impelling rotor for pitching ears of corn from a corn harvesting machine to a trailing wagon and including means for speeding up the rotor throughout a predetermined angular movement of the rotor.

Still another important object of this invention is the provision of cleaning fan means associated with a corn pitcher.

Another and still further important object of this invention is to supply a cleaning fan in a position adjacent to and beneath the corn guiding housing of a corn pitcher so that a stream of air is impelled through the housing at a faster rate of speed than the movement of the harvested ears of corn whereby trash and other lighter material is separated from the corn at the point of discharge from the corn pitcher housing.

A still further important object is to provide a corn pitcher with a cleaning fan disposed centrally of a corn impelling rotor and wherein the fan and rotor are on the same axes but the fan is rotated at a substantially higher speed than the rotor to accomplish a differential in the movement of light trash over the ears of corn.

Still another important object of this invention is to equip a rotor with paddles thereon for pitching ears of corn and wherein the paddles are slowed down at the bottom of the receiving housing to lessen the shock against the ear corn when it is picked up and thrown rearwardly to a trailing wagon or the like.

Another important object of this invention is to provide a transversely disposed auger conveyor for delivering harvested ears of corn laterally into an impelling rotor of substantially the same diameter as the auger conveyor whereby there are paddles on the impelling rotor substantially coextensive with the auger flight and there is no loss of control in the transition of the ears of corn as they pass from the auger conveyor to the impelling rotor.

Other and further important objects and advantages will become apparent from the disclosures in the following specification and accompanying drawings.

Figure 1:
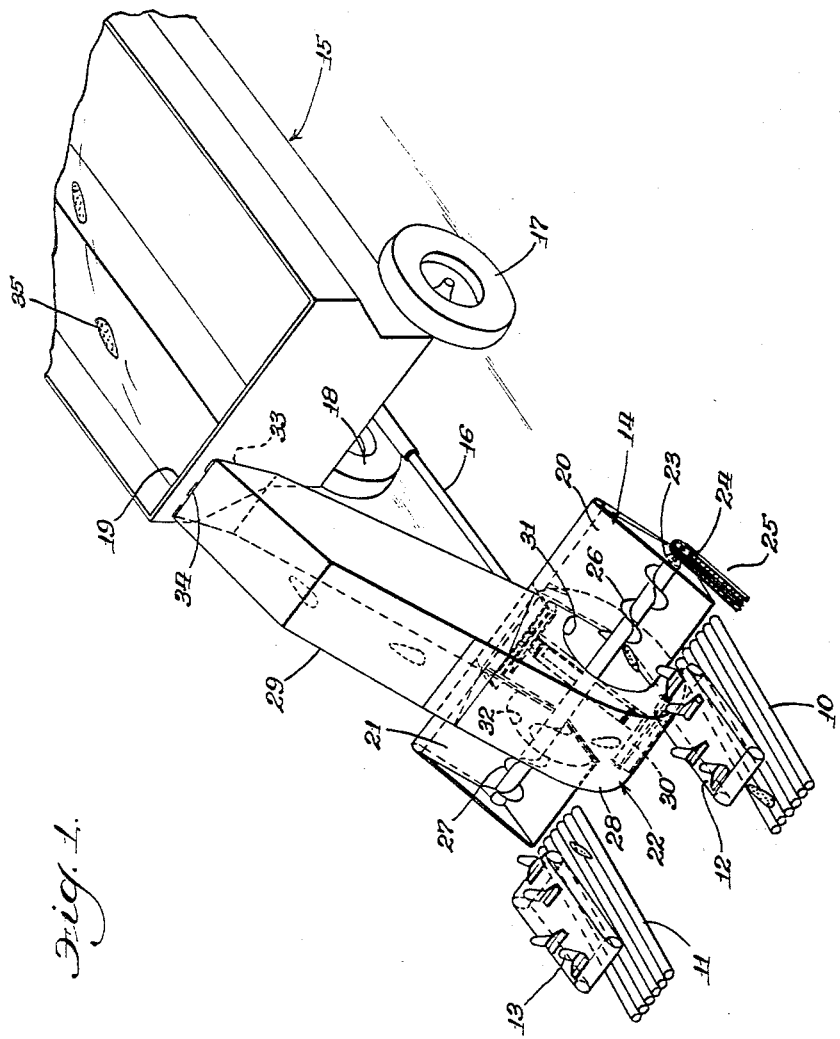
Figure 1 is a perspective view showing the corn pitcher of this invention with a trailing wagon and including a diagrammatic illustration of the husking beds of a corn picker for delivering harvested ears of corn to the corn pitcher.

As shown in the drawings the reference numeral 10 indicates generally a corn husking bed which forms a part of a corn picker such as shown in the B. M. Hyman et al. Reissue Patent 22,279. It is evident from this earlier patent that the corn pickers or corn harvesting machines generally have a separate delivery of corn from each row of corn picked. In other words a two row corn picker discharges ears from spaced points at the rear of the machine in line with the rows from which they are picked. In the machine as shown there are two husking beds, 10 as previously stated, and 11. Each of these husking beds includes a plurality of husking rolls which are adapted to receive harvested ears of corn and remove the husks therefrom. Ear forwarder conveyors 12 and 13 are provided over the husking beds 10 and 11 respectively and are two-fold in purpose. One purpose is to keep the ears moving over the husking rolls in order to cause various alignments relative to the rolls to thereby encourage and facilitate the removal of husks from the ears and the second purpose is to cause the ears to be discharged at the ends of the husking beds for final gathering and depositing in a trailing wagon or the like. In the usual corn pickers of present-day design there is utilized a receiving hopper to accept the snapped and husked ears of corn from the corn picker and thereupon aggregate the harvested ears from the rows and elevate them to a trailing wagon.

As best shown in Figure 1 a transversely disposed corn receiving hopper 14 is provided immediately rearwardly of the husking beds 10 and 11 and is for the purpose of receiving ears of corn from the harvesting unit. For purposes of clarification it should be understood that the device of this invention will function with merely snapped ears of corn as the corn need not be husked although in the present instance it is contemplated the ears will be husked before they are pitched into a receiving wagon 15 which trails behind the corn harvester. The wagon 15 is provided with a tongue 16 projecting forwardly therefrom which hitches onto the forwardly disposed tractor mounted corn picker. The wagon 15 also is equipped with ground-engaging wheels 17 and 18 at its forward end and the box thereof 19 is disposed somewhat rearwardly of any of the projecting members of the corn harvester with the corn pitcher forming a part thereof. The rear portion of the trailing wagon was of necessity broken away, but it should be understood it is of conventional construction.

The hopper 14 includes end receiving portions 20 and 21 and a central portion 22. A shaft 23 extends transversely of the entire corn harvesting mechanism within the hopper 14. A sprocket 24 is mounted on the outer end of the shaft 23 and by means of a chain 25 drive is imparted to the shaft 23. An auger conveyor having screw flight 26 is provided within the end portion of the hopper 14 and similarly an auger conveyor having screw flight 27 of opposite pitch is provided on the shaft 23 within the end portion 21 of the hopper 14. Rotation of the shaft 23 thus causes the auger conveyors 26 and 27 to feed ears of corn centrally toward the chamber 22 on the hopper 14.

Figure 2:
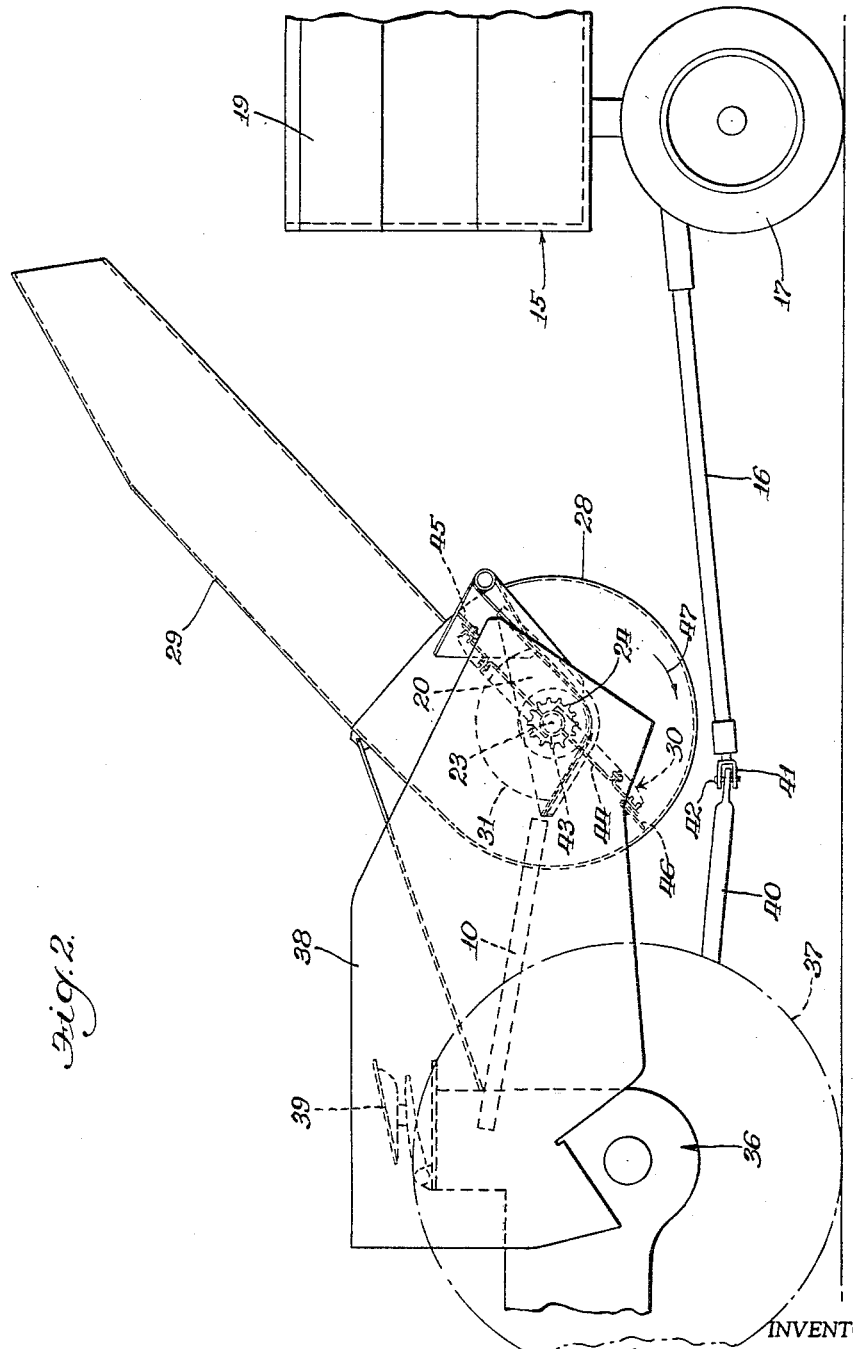
Figure 2 is a side elevational view of the device as shown in Figure 1.

The central section of the platform 14 designated generally at 22 contains an enlarged circularly shaped housing or enclosure 28 which has a radial discharge opening to which a guiding tube or the like 29 may be attached as shown in Figures 1 and 2. The use of the tube extension 29 is optional. The paddled rotor 30 is mounted on and affixed to the driven shaft 23 so that when ears of corn are fed through the side openings 31 and 32 respectively for the auger conveyors 26 and 27 the ears are thence thrown or pitched by the rotor 30 upwardly and rearwardly through a discharge opening in the housing 28 and thence through the guiding tube in a generally predetermined trajectory for deposit of the ears of corn in the trailing wagon 15. A freely hinged gate 33 may be optionally provided at the upper end of the tube 29 and upon the ears of corn striking the gate it swings upwardly about its hinge mounting 34 and thereupon permits the corn to be propelled into the box 19 of the trailing wagon 15 as shown at 35. Figure 2 shows a side elevational view of the device of Figure 1 without a gate closure 33 and better depicts certain portions thereof. For example the rearward end of the implement receiving tractor is shown at 36 and discloses large, ground engaging traction wheels 37. Housings 38 enclose the husking rolls 10. The tractor 36 is further provided with an operator's seat 39 and a rearwardly extending drawbar 40. The drawbar 40 provides the hitch means for the wagon tongue 16 by means of a clevis 41 and a locking pin 42. The locking pin 42 removably passes through the forwardly disposed clevis 41 on the wagon tongue 16 and through the rearward end of the drawbar 40 of the tractor to thus lock the members together. The paddled rotor 30 includes a hub 43 affixed to the shaft 23 at substantially the center thereof and disposed within the enlarged enclosure 28. A cross frame or spider member 44 carries radially disposed paddle members 45 and 46 by means of which the ears of corn dropping into the chamber 28 are pitched in the direction of the arrow 47 upwardly and rearwardly through the tubular member 29. The speed of the rotor 30 is such that as the paddles 45 and 46 strike the ears of corn in the bottom of the enlarged enclosure 28 they are pitched through a trajectory which terminates within the wagon box 19. The tubular enclosure 29 is merely for the purpose of guiding ears of unusual shape and weight to thereupon insure the deposit of all of the corn within the trailing wagon 15. There is no conveying means located within the tubular extension 29 but rather the mere force of the pitching paddles 45 and 46 cause the ears to be thrown rearwardly into the trailing wagon.

Figure 3:
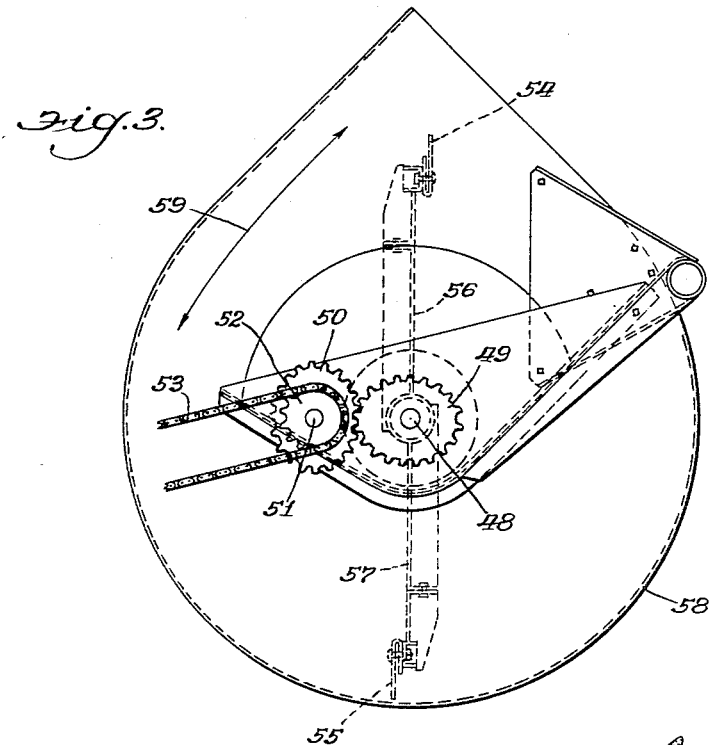
Figure 3 is a sectional view taken through a modified form of corn pitcher of this invention.

In the modified form of the corn pitcher of this invention as shown in Figure 3 a hopper shaft 23 corresponds to the shaft 23 in Figures 1 and 2. The only difference between the device of Figures 1 and 2 and that shown in Figure 3 is the driving mechanism from the outside of the hopper. In lieu of the sprocket 24 as in Figure 1 there is provided an elliptical gear 49 which is in meshing engagement with a similar elliptical gear 50 carried on a stub shaft 51 immediately forwardly of the hopper shaft 48. Also mounted on the shaft 51 is a sprocket 52 which receives a chain 53 to impart drive to the shaft 51 and thus the elliptical gear 50. The elliptical gears 49 and 50 are arranged at substantially right angles to one another so that they may continue their meshing engagement despite their irregular shapes and deliver rotational drive from the shaft 51 to the shaft 48. However, the rate of speed of the shaft 48 is varied due to the differential in mechanical advantage throughout the range of movement of the cooperative elliptical gears 49 and 50. In the device as shown in Figure 3 paddles 54 and 55 are carried on cross members 56 and 57 mounted on the shaft 48. The rotor comprising the paddles and cross members is disposed in the central section of an enlarged housing 58 in the corn receiving hopper. The corn pitching rotor is slowed down at the bottom of the enlarged housing 58 to lessen the shock against the ears of corn when the corn drops down from the auger trough on both sides of this central enlarged housing 58. In other words as the ears of corn are picked up from the bottom of the housings 58 they are picked up by the paddles 54 and 55 when those paddles are running at a considerably lesser speed than the speed necessary to pitch the ears of corn outwardly and rearwardly to a trailing wagon depositary. Immediately following the pickup of the ears from the bottom of the housing the rotor speed picks up due to the changing mechanical advantage of the meshing elliptical gears 49 and 50, in the pitching area shown by the two headed arrow at 59, to thereupon impart sufficient velocity to the ears of corn for throwing the ears the entire distance between the enlarged enclosure 58 and a trailing wagon. In the device as shown in Figure 3 there is no tubular upper and rearward extension corresponding to the tubular member 29 in Figures 1 and 2 although it should be understood the varying speed driving mechanism may be employed equally well either with or without the guiding enclosure 29.

In the operation of the device as shown in Figure 3 the mechanism works substantially the same as that for Figures 1 and 2. Snapped and/or husked ears of corn are deposited in both sides of the hopper and fed centrally by auger conveyors into the central housing 58 whereupon the ears fall to the bottom of that housing and are picked up by a gradual and relatively slow movement of the paddles 54 and 55 whereafter the paddles materially speed up and cause the ears carried thereby to be pitched or thrown upwardly and rearwardly into a trailing wagon.

Figure 4:
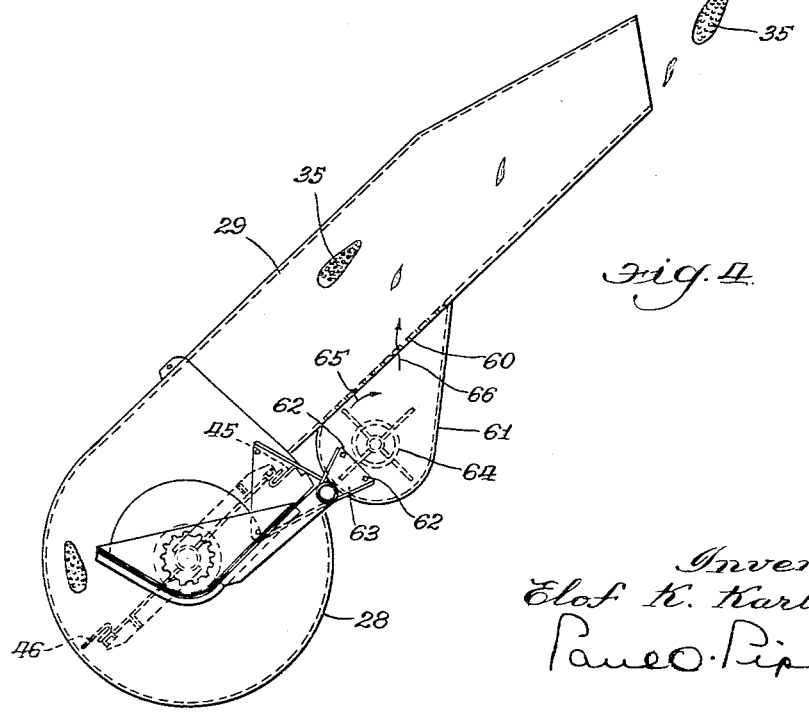
Figure 4 is another sectional view taken through a still further modified corn pitcher.

Figure 4 discloses a device similar to that shown in Figures 1 and 2 with a cleaning mechanism for the harvested corn. Inasmuch as all of the mechanism is identical to that shown in Figures 1 and 2 except for certain additional material the same reference numerals will be applied to the device in Figure 4 except for those added parts. As the harvested corn is deposited in the hoppers 20 and 21 it is apt to contain trash, dust and other foreign matter. It is therefore desirable to effect a separation of the trash and foreign matter from the corn before deposit in the trailing wagon. As shown in Figure 4 the underside of the tubular guiding member 29 is provided with a perforated section 60 to which is attached therebeneath an auxiliary housing 61 which is fastened by means of bolts or the like 62 to a bracket 63 forming a part of and extending rearwardly from the transversely disposed hopper 14. A fan 64 is journally mounted within the lower housing 61 and is provided with means on the side thereof to effect driving rotation. The fan is rotated in the direction of the arrow 65 to thus cause a blast of air to be directed upwardly and rearwardly as indicated by the arrow 66 through the perforate wall 60. The stream of air insures the upward and rearward movement of light trash or the like at a speed with a differential from the speed of the pitched ears of corn by the paddled rotor 30. The fan does two jobs that of maintaining the guiding housing 29 clear of trash on the lower wall thereof and separates this trash from the ears of corn before they are deposited in the trailing wagon. All of the material received from the husking beds is delivered transversely to the central housing 28 whereupon everything is swept upwardly and rearwardly through the tubular member 29. However, the light trash and other material does not have the propulsion necessary to drive it completely out of the end of the tubular member 29 and thereupon an auxiliary fan is desirable in some instances to blow the light trash material upwardly and rearwardly at a speed having a differential to the speed of the pitched ears 35. Immediately upon its exit from the tubular member 29 the light trash material falls down on the ground whereas the pitched ears continue to travel rearwardly to a position over the box 19 of the trailing wagon 15.

Figure 5:
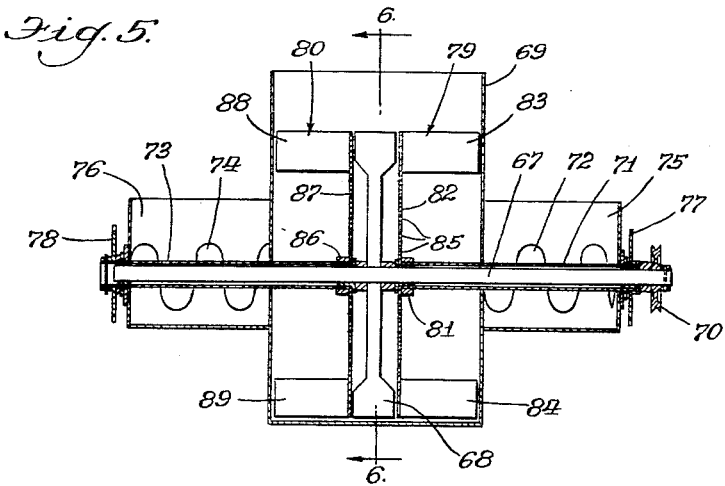
Figure 5 is a transverse sectional view through a further modified form of corn picker.
Figure 6:
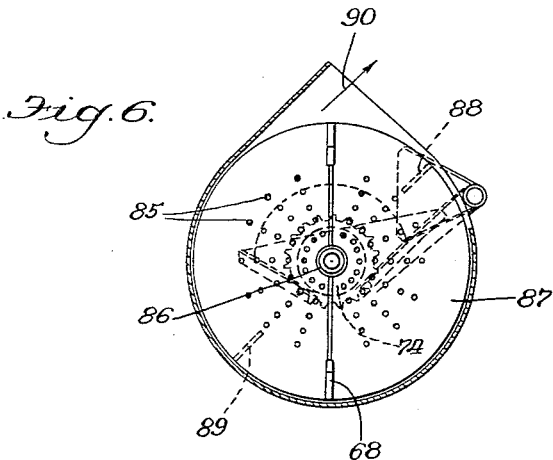
Figure 6 is a sectional view taken through the line 6—6 of Figure 5.

Figures 5 and 6 show a further modified form of the corn pitching device of this invention and again provide for cleaning mechanism integral with the corn pitcher. The hopper and pitching mechanism comprises a central shaft 67 on which is mounted on the center thereof a fan rotor 68. The fan rotor 68 is relatively narrow in construction and is disposed within the center portion of the central enlarged housing 69 of the corn pitcher. A V-pulley 70 is affixed to the outer end of the shaft 67 and thereupon drive is delivered through the pulley 70 to the fan 68. An outer sleeve shaft 71 is journally mounted over the center shaft 67 in a concentric and coaxial manner and provides the support for auger screw flight 72. Similarly another concentric sleeve shaft 73 is provided over the other end of the shaft 67 and carries oppositely pitched screw flight 74 at that end of the device. Corn receiving hopper portions are shown at 75 and 76 respectively around each of the auger conveyors 72 and 74. A sprocket member 77 is keyed or otherwise fastened to the sleeve shaft 71 and similarly a sprocket at the other end of the device shown at 78 is keyed or otherwise fastened to the sleeve shaft 73 whereupon drive delivered to these sprockets 77 and 78 causes rotational drive of the auger conveyors 72 and 74. Corn pitching paddled rotors 79 and 80 are driven by the sleeve shafts 71 and 73. The rotor 79 includes a hub 81 mounted on the sleeve shaft 71 and has a disk-like member 82 projecting radially outwardly. The outer circumference of the disk 82 is provided paddle members 83 and 84 which are comparable to the paddles 45 and 46 in the device of Figures 1 and 2 and 54 and 55 in the device of Figure 3. The disk-like support member 82 is equipped with a plurality of apertures 85 through which air may pass from the corn pitching portion of the chamber 69 to the fan portion occupied by the fan rotor 68. The sleeve shaft 73 also carries a pitching rotor 80 and is provided with a shaft engaging hub 86, a perforated disk-like plate 87, and paddle members 88 and 89 to cause the ears of corn fed from the hopper 76 by means of the auger conveyor 74 to be pitched upwardly and rearwardly in a trajectory for deposit into a trailing wagon. It is thus obvious that the corn pitcher of the device of Figures 5 and 6 will elevate the ears of corn and will simultaneously separate dirt and trash which is lighter than the ears of corn. The fan rotor 68 in the center of the corn pitching housing 69 draws air in through the perforated plates 82 and 87 and discharges a stream of air upwardly and rearwardly in the direction of the arrow 90 which is the path of travel of the ears of corn. However, the light trash and dirt falls far short of the wagon box thus insuring a separation of the dirt and trash from the ears of corn prior to gathering of the harvested ears in a trailing wagon. The operation of the device of Figures 5 and 6 is substantially identical to that of the device of Figure 4 wherein harvested corn is pitched upwardly and rearwardly by the paddles 83, 84, 88 and 89 in a generally arcuate path for deposit into a trailing wagon. The fan located centrally of the rotor in a symmetrical manner and being easily driven provides for a stream of air to discharge light trash material with the gathered corn.

Figure 7:
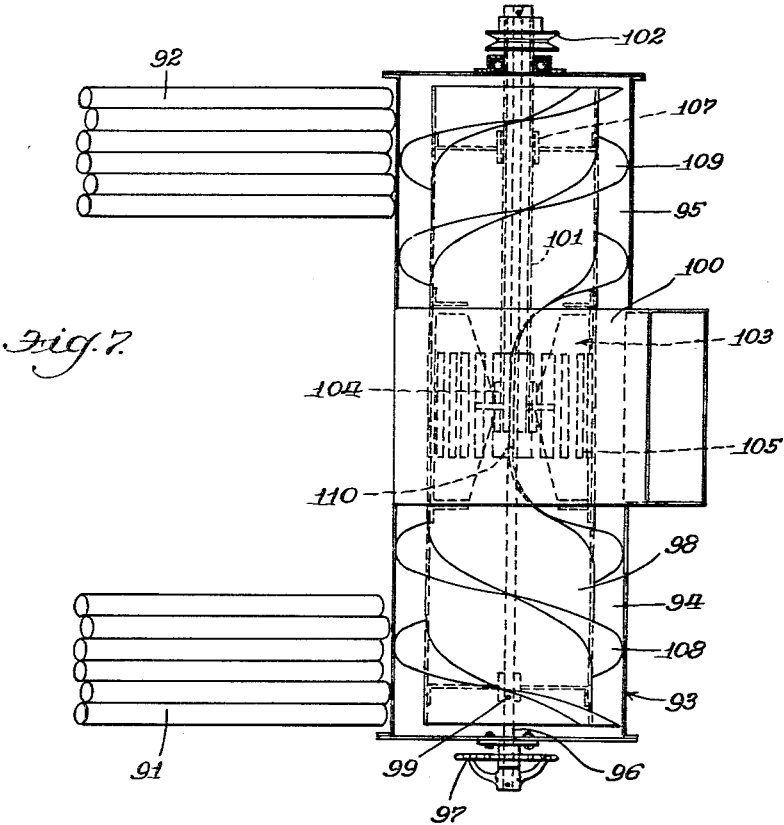
Figure 7 is a top plan view of a further modified form of corn pitcher.
Figure 8:
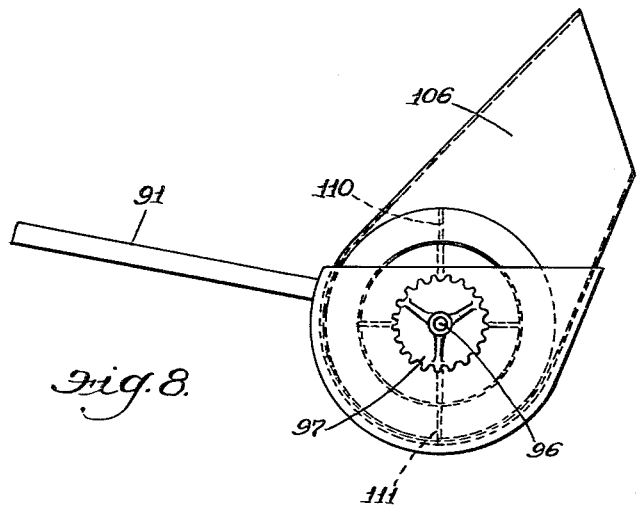
Figure 8 is an end elevational view of the device as shown in Figure 7.

Another modified form of the invention is shown in Figures 7 and 8 wherein there is again depicted husking beds 91 and 92 each of which comprises a plurality of cooperative husking rolls. Ears of corn husked by the husking mechanisms 91 and 92 are dropped downwardly and rearwardly into a generally transversely disposed hopper 93 which as in the device of Figure 1 has end receiving portions 94 and 95. A shaft 96 passes through the entire hopper 93 and has a sprocket 97 affixed to the outer end thereof for effecting rotational drive thereof. A relatively large core member 98 is fastened to the shaft 96 by means of a pin or the like 99. Thus as the sprocket 97 is rotated so also is the shaft 96 and the large diameter core 98. The core 98 extends the full width of the trough 96 and through a central housing portion 100 which contains an ear pitching mechanism as in all of the other modifications of this invention. A concentric sleeve shaft 101 is journalled over the driven shaft 96. The concentric sleeve shaft 101 is provided with a V-pulley 102 at the outer end thereof thus imparting drive thereto. The shaft 101 terminates centrally of the hopper 93 and within the core 98. A fan rotor 103 is affixed to the sleeve shaft 101 by means of a hub 104 and thereupon the fan 103 having a circumference extent within the core 98 is adapted to be rotated when the V-pulley 102 is rotatably driven. A plurality of spaced apart slits or louvers 105 are provided in the circumference of the core 98 at substantially the center thereof adjacent the fan 103, whereupon the fan rotor may impel a stream of air outwardly through the louvers or slits in the core 98 and send a stream of air upwardly in the direction of the arrow 106 as shown in Figure 8. The fan 103 thereupon discharges light trash material from the corn pitcher and at the same time separates trash material from the ears of corn which are being pitched rearwardly to a trailing wagon. As shown in Figure 7 the core 98 is merely journalled freely over the sleeve shaft 101 at 107 to thereupon guidingly hold the core 98 in alignment within the corn receiving hopper 93. The core 98 is provided with screw flight 108 at the end 94 and is provided with oppositely pitched auger screw flight 109 at the end 95 of the hopper 93. The corn pitching paddles shown at 110 and 111 are of substantially the same height as the screw flight and constitute continuations of the opposed screw flight 108 and 109 so that as corn is delivered transversely of the machine and into the central section of the corn pitcher there is no dropping of the ears and no sudden striking of the ears by the pitching rotor inasmuch as the paddles are continuations of the screw flight and there is no period of time when the ears are separated from control by the screw flight or their intermediate paddle members. This eliminates the possibility of shock to the ears when the paddles engage the ears and pitch them upwardly and rearwardly into a trailing wagon. The device of Figures 7 and 8 thus operates substantially the same as the device of Figures 5 and 6 with a unitary cleaning mechanism located centrally and within the corn pitcher.

It will be obvious that herein is provided a corn pitcher wherein numerous details of construction may be varied throughout a wide range without departing from the principles disclosed herein and I therefore do not propose limiting the patent granted hereon otherwise than as necessitated by the appended claims.

What is claimed is:

1. An ear corn pitcher for corn harvesters comprising a hopper, an auger conveyor rotatably driven within said hopper, an impelling rotor rotatably driven within said hopper and arranged to receive ears of corn from said auger conveyor for pitching them out of the hopper, a tubular housing adjoining said hopper adjacent said impelling rotor to thereby guide the ears of corn as they are pitched by the impelling rotor, an auxiliary housing disposed beneath said tubular housing, and said tubular housing wall perforated at its juncture with said auxiliary housing, and a driven fan mounted in said auxiliary housing and discharging a blast of air through the perforate wall of the tubular housing and effecting a separation of light trash from the ears as they are pitched through said tubular housing.

2. An ear corn pitcher for corn harvesters comprising a hopper, an auger conveyor rotatably driven within said hopper, an impelling rotor rotatably driven within said hopper and arranged to receive ears of corn from said auger conveyor for pitching them out of the hopper, the central portion of the hopper including a housing for said impelling rotor with a discharge opening therein, a shaft extending across said hopper; and through said impelling rotor housing, a fan rotor affixed to said shaft, a concentric sleeve shaft journally mounted over said shaft and having said auger conveyor mounted thereon, and said sleeve shaft carrying said impelling rotor, and means separately driving said shaft and said sleeve shaft whereby the ears are pitched through said discharge opening and light trash material is separated from the ear corn by the fan rotor.

3. A device as set forth in claim 2 in which the impelling rotor has a perforate wall adjacent the fan rotor.

4. A device as set forth in claim 2 in which a second concentric sleeve shaft is journally mounted on said shaft on the other side of said fan rotor, and said second concentric sleeve shaft having an auger conveyor mounted thereon and an impelling rotor at the inner end adjacent the fan rotor whereby the fan rotor is flanked by an impelling rotor on both sides thereof within said housing.

5. A device as set forth in claim 4 in which each impelling rotor has a perforated side wall adjacent said fan rotor.

6. An ear corn pitcher for corn harvesters comprising a hopper, an auger conveyor rotatably driven within said hopper, an impelling rotor rotatably driven within said hopper and arranged to receive ears of corn from said auger conveyor for pitching them out of the hopper, the auger conveyor and impelling rotor having a core of substantially the same diameter, and said auger conveyor having screw flight thereon and said impelling rotor having paddles thereon, and said screw flight and paddles being substantially the same height and the paddles forming continuations of said screw flight.

7. A device as set forth in claim 6 in which there is included an auger conveyor on both sides of said impelling rotor.

8. A device as set forth in claim 6 in which there is included a fan means disposed within said core at the position of the impelling rotor, and said core having openings in the circumference thereof to permit the fan means to discharge a blast of air along with the pitched ears of corn.

9. A device as set forth in claim 8 in which there is included means for separately driving said fan means from said auger conveyor and impelling rotor.

10. A corn pitcher comprising a transversely disposed ear corn receiving hopper, a central circular housing formed integrally with said hopper, auger conveyors arranged and constructed in both ends of said receiving hopper to deliver corn to said central housing, said central housing having a discharge opening in the circumference thereof, and corn impelling means in said central circular housing to pitch corn through said circumferential opening.

11. A device as set forth in claim 10 in which there is included fan means to effect a discharge of trash from said central circular housing.

12. A corn pitcher for corn harvesters comprising a corn impelling rotor, said rotor having a generally horizontal axis, a generally circular housing arranged and constructed to cover said rotor, a tubular member communicating with an upper portion of said housing and forming an upward extension thereof, said tubular member having openings in the side thereof, a fan mounted adjacent said side openings in the tubular member and adapted to direct a blast of air through said tubular member for separating trash from corn, said housing having an opening in the side thereof spaced below the juncture of the tubular member with said housing, and a conveyor arranged and constructed to feed corn in a direction generally parallel to said rotor axis into the side opening of said housing, whereby corn delivered to said housing by said conveyor is impelled upwardly by said rotor through said tubular member at which time it is cleaned by the air blast of said fan prior to its discharge through the open end of the tubular member.

References Cited in the file of this patent

UNITED STATES PATENTS

| | | |
|---|---|---|
| 653,058 | Beggs | July 3, 1900 |
| 1,638,708 | Saxon | Aug. 9, 1927 |
| 2,257,097 | Anderson et al. | Sept. 30, 1941 |
| 2,711,244 | Hyman | June 21, 1955 |